March 24, 1936.  C. M. SCHERER  2,035,195

EYEGLASSES

Filed Feb. 6, 1933

Inventor:
Charles M. Scherer,
by Charles O. Shurey
his Atty.

Patented Mar. 24, 1936

2,035,195

UNITED STATES PATENT OFFICE 2,035,195

EYEGLASSES

Charles M. Scherer, Chicago, Ill.

Application February 6, 1933, Serial No. 655,299

3 Claims. (Cl. 88—47)

This invention relates to eye glasses, this term herein being used to include both pince-nez and spectacles. Some drawbacks of clips, cemented to eye glass lenses heretofore, have been that their union with the lenses is not secure, because the free sides of the anterior and the posterior leaves of the clips are likely to spread apart slightly, or because the cement is likely to slip on the glass, or because a slot has been cut through the edge portion of the lens to receive a fin from the clip, which is likely to cause the glass to crack. Some of my objects are to avoid both the slipping of the cement on the glass and the clip, and to eliminate the slit and to provide an improvement whereby the lens will be properly located in the clip and the clip will be properly located on the lens without the work of making the slit and thereby weakening the glass.

Experience indicates that, whereas drilling holes or cutting slits through glass tends to break the glass while the work is being done or to leave the glass in condition to break easily later, the surface of glass may be sand blasted, ground or otherwise roughened without materially weakening the glass.

My invention involves a multiplicity of pits or projections or both on the marginal portions of the anterior and posterior faces of the lenses, and if desired on the edges where the cement is to be applied at the places where the clips are cemented thereto, as a means of preventing the cement slipping on the glass. It is the usual experience, that cement does not break away from cement—that is, it does not come off in pieces from the glass—but all the cement usually slips off the glass in one piece. While cement adheres better to metal than to polished glass, I take the precaution of forming pits or projections or both in the cementing portion of the clip. The setting of cement in the pits or depressions in the lens and in the pits or depressions in the cementing portions of the clip and projections from the lens and from the clip into the cement produces a tooth and socket effect and serves to effectively prevent the lens or the clip from slipping from the cement sideways.

While in some cases my clip is placed on a single straight side of a lenticular edge when a lens is edged straight at the place where the clip is attached to it, I provide in other cases positioning means for the clip without resorting to a slit or notch in the edge of the lens. I do this by so shaping a lenticular edge and the clip used with it, that a bend in said edge fits a bend in the clip opposite the first bend. Whether the bend is a curve or a single angle or multiple angles on the edge of a lens, those specially provided shapes act as guides for placing the clip in the desired position on the lens, not to mention other advantages that will appear later. These curves or angles are made when the lenses are edged in the ordinary way, so they call for no extra work and the lens is left as strong as the surfacing left it, which cannot be said for a lens that has a hole drilled through it or a slit cut through it.

The invention consists therefore in an eye glass lens having a roughened lenticular edge portion, either within or without the visual portion of the lens, combined with a clip cemented to said roughened portion. It further consists in an eye glass lens having innumerable minute pits or depressions formed in the lenticular edge portion, combined with a clip, which if desired may also be formed with pits or depressions or with projections, cemented, or otherwise adhesively secured to the prepared edge portion of the lens. It further consists in an eye glass lens having angularly disposed edges, or edges that are not edged straight combined with a clip fitted to said edge whereby the clip can be positively located on said edge without the use of screw holes or slits in the lens. The invention further consists in the several novel features hereinafter fully set forth and claimed:

The invention is clearly illustrated in the accompanying drawing, in which:

Fig. 1 is a side elevation of an eye glass lens and one clip illustrating one embodiment of the present invention;

Figs. 2 to 8 inclusive are side elevations of various shapes of eye glass lenses with their lenticular edges prepared for the reception of clips;

Figure 1:
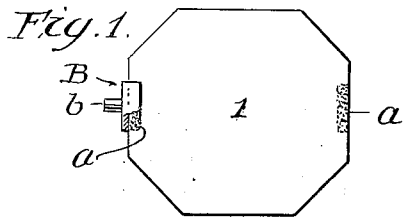
Figure 11:
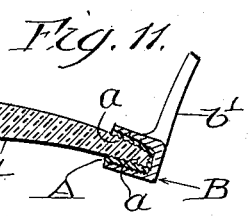
Fig. 11 is an enlarged detail horizontal section through a lens and clip secured together in accordance with the present invention.

Referring to said drawing and first to Figs. 1 and 11, a polygonal eye glass lens is shown at 1, which is provided with innumerable minute pits or projections, or both, *a*, on the anterior and posterior faces, at the place or places where the clip or clips B are secured thereto, said prepared surfaces providing a means of holding cement more firmly, than would smooth, polished glass.

In Fig. 1 a clip is secured at one edge only and may represent the clip for the bridge or it may represent the clip for the temple. The clip is cemented or otherwise adhesively secured to the prepared part of the lens by cement or other adhesive A (see Fig. 11).

A stud $b$, or shank $b^1$, projects from the clip and may be attached to the bridge or temple by any conventional method. The stud or shank may be placed on any part of the clip and at any angle with the edge to which the clip is secured and may project forwards or backwards from the clip.

Figure 9:
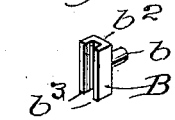
Fig. 9 is a perspective view of the form of clip used on the lens seen in Fig. 1.

The clip shown in Figs. 1 and 9, has one straight cross wall $b^2$ from which project anterior and posterior leaves $b^3$ that straddle the cementing portion of the lens and if desired may be prepared on their inner faces with pits or depressions to provide roughened surfaces. When the clip is cemented to the prepared edge portion of the lens, the setting of the cement in the pits or depressions produces a tooth and socket or interlocking effect, thereby effectively preventing the clip from slipping off the lens or from becoming accidentally disconnected therefrom.

The pits or depressions $a$, may be produced on the lens at the places where the clip or clips are to be secured thereto by the ordinary sand blasting, grinding or etching processes, care being taken to treat only the portions of the lens over which the clip or clips extend. Desirably only very narrow portions may be surface treated and the leaves of the clip may therefore be very narrow so as not to interfere materially with the visual portion of the lens. The clip may of course be located at any selected prepared place along the straight side edges of the lens.

Figure 2:
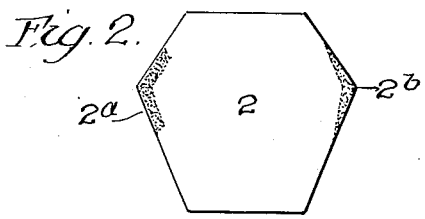

In the form of the invention illustrated in Fig. 2, a polygonal eye glass lens 2, is shown in which there are two oppositely disposed angles where cementing portions $2^a$, $2^b$, are provided on the anterior and posterior faces of the lens as above explained in connection with the form of the invention illustrated in Fig. 1. Clips fitting over said prepared portions $2^a$, $2^b$ will be in contact with a bend and two sides of the lenticular edge. In this case the lens 2, is more securely retained in its clips, for the reason that each clip consists of two arms or branches extending in different directions. Force tending to twist the lens sideways out of one narrow arm or branch of the clip will be more strongly opposed by the other arm, since if it was a sidewise twist for one arm it could not be sidewise for the other. This holds the lens in the clip well, and enables me to keep the clip narrow prependicularly to the lenticular edge, a very desirable gain. It also attaches the clip to a longer stretch of glass, which prevents the lens from being broken easily. By itself the irregular edge of the lens holds cement well and the cement line on said edge is relatively long.

The placement of the clip on two sides of an angle in the lenticular edge affords another advantage, in this: Heretofore slits have been cut through the lenticular edge and fins from the clip fitted into said slits, which weaken the lens, said slits and said fins being used to locate the lens in the required place, whereas the angular edge of the lens 2 and its cementing portion and their counterpart in the clip definitely fix the place where the clip will correctly fit on the lens. Thereby I avoid the work of making a slit, the possible breaking of the lens during such work, and the weakened condition of the lens later. Not only is my lens left strong, but its angle for locating the lens is formed on its edge when the lens is automatically edged in the ordinary way.

Clips heretofore have been cemented to lenses by means of a rabbet joint, which I use in some cases, as shown in Fig. 1. But a stronger union is effected by a joint as shown in Fig. 2 and which is in the nature of a mortise and tenon joint. A rabbet joint may result in the anterior and the posterior leaves of a clip spreading apart slightly at their free side, since said leaves are connected together at only one side. Such spreading tends to loosen the cement. A mortise and tenon joint have the leaves of the clip fastened together at one side and two ends, three places not parallel to a straight line. This attachment of the anterior and the posterior leaves of the clip at three such places is more plainly shown at $4^a$, $4^b$ in Fig. 4, at $6^a$, $6^b$ in Fig. 6 and at $7^a$ and $7^b$ in Fig. 7; and is used in the clips of all the lenses shown except on the one illustrated in Fig. 1. The mortise and tenon structure enables the clip to undergo a greater strain sidewise—or any other direction—without its two leaves spreading apart and loosening the cement. Besides making a stronger joint with the same gauge of metal, my mortise and tenon joint enables me to make the leaves thinner, therefore cheaper and more sightly.

Figure 3:
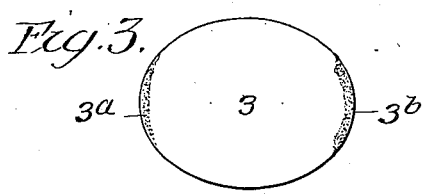

Fig. 3 shows a lens 3 and its curved cementing portions $3^a$ and $3^b$. When the edge of the lens has a small enough curve and the clip extends far enough around the curve, I get practically the bracing advantage for the clip, that is shown on lens 2 (Fig. 2) and its angular edge; and with the form of leaves shown in Fig. 3, the clip can be made very narrow so as not to encroach materially on the visual portion of the lens.

Figure 4:
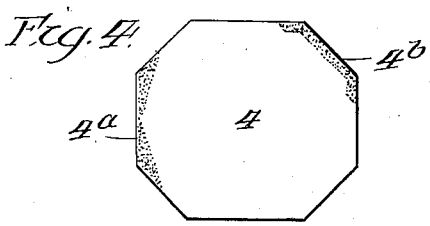

Fig. 4 shows lens 4 and cementing portions $4^a$ and $4^b$, said portions extending around two angles and on three sides of the lenticular edge, which give more security to a clip than a clip would have if extending around only one angle. Cementing portion $4^b$ may be desirable in the position it is shown, when a temple is to be used that is attached high on a lens, or for other uses.

Figure 5:
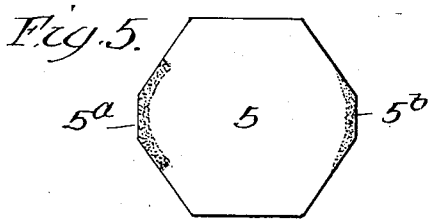

Fig. 5 shows another type of cementing portions $5^a$ and $5^b$ on the lens 5, that comprises short sides of the lenticular edge centrally placed in said portions.

Figure 6:
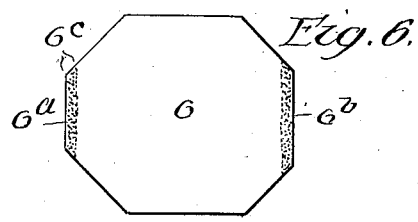

Fig. 6 shows lens 6 having a specially provided extension $6^c$ projecting sidewise from the visual portion of the lens, so that a suitable clip may be cemented to the extension, leaving the visual portion of the lens clear to look through. The extension $16^c$ does not cut off any of the visual field as does the cementing portion $6^b$ that is positioned on part of the visual face of the lens. In that respect the extension $6^c$ is an improvement over any former type of cementing portion and it helps to provide a good-looking and durable lens.

Figures 7, 13:
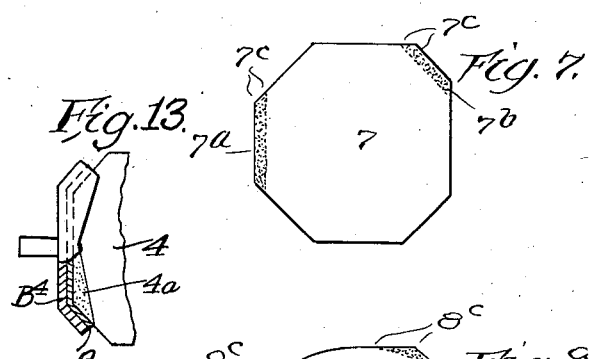
Fig. 13 is a fragmental side elevation of a polygonal lens with the form of clip, shown in Fig. 10, applied thereto, and the clip being partly broken out.

Fig. 7 shows a lens 7 having two specially provided extensions $7^c$ for cementing portions $7^a$, $7^b$, both of which are outside the visual portion of the lens. The extensions $7^c$ are shown on an octagonal lens, but may be provided on various shapes in lenses.

Figure 8:
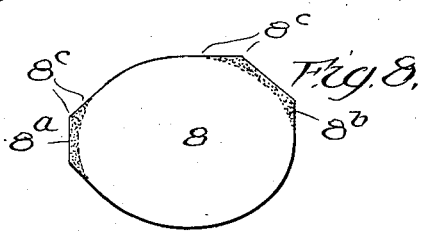

Fig. 8 shows an oval lens 8 having two specially provided extensions $8^c$ for cementing portions $8^a$, 8ᵇ outside the visual portion of the lens, which will provide a lens that is both attractive and durable.

Fig. 9 shows the clip B for lens 1, formed with a slot or groove to receive the lenticular edge, and the stud b, said stud being suitable for attachment to a bridge or a temple in any practical way. The faces of the slot like the cementing portion on the lenses may have pits or projections or both on its surfaces to hold cement more securely. Every projection of cement into a pit in the lens or in the clip and every projection from the lens or from the clip into the cement serves as would the end of a dowel in preventing slipping sidewise of the cement on the lens or in the clip; and that in combination with a clip whose anterior and posterior leaves are attached to each other on two or more sides, makes a cemented union of the lens in the clip, that is unusually secure as well as neat.

Figure 10:
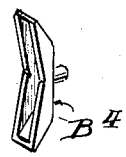
Fig. 10 is a perspective view of a clip used on the left hand edge of the lens seen in Fig. 4.

Fig. 10 illustrates a form of clip B⁴ that is used in connection with the shape at the left hand of Fig. 4 where it will be seen that the leaves are joined on three sides with the cross wall, thereby providing for a mortise and tenon joint with the lens.

Figure 12:
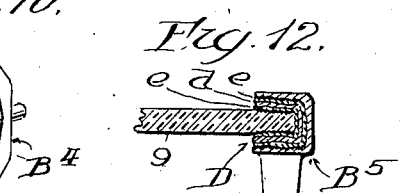
Fig. 12 is an enlarged detail horizontal section illustrating an additional improvement.

Fig. 12 shows a cushioned cementing means D that comprises a yielding layer d between two adhesive layers e, that are applied to the clip B⁵ and lens 9. Jarring may break lenses where clips are attached to them with unyielding cement; so, I prefer to use a cement joint having some flexibility. When enough flexibility cannot be got otherwise, I use the device shown in Fig. 12, wherein layer d may be of celluloid, leather, cloth, rubber, or any other compressible or flexible material attachable to the clip and the lens by layers e in a manner to produce a cushioning effect. Furthermore, glass and metal differ somewhat in their rate of expansion under the same changes in heat; and a cushioning connection between the clip and the lens can endure their different expansions without weakening and without injury to the glass.

The term "rough" or "roughened" used herein in connection with the cementing portions of the lenses or clips, is intended to include surfaces that are sand blasted, ground, etched or otherwise treated to leave innumerable pits or depressions and projections, grooves and ridges, or any other unevenness as distinguished from a smooth surface.

I claim as new and desire to secure by Letters Patent:

1. In an eye glass, a lens having a roughened cementing portion on at least one of its faces and a clip straddling the edge of the lens at the roughened cementing portion and secured thereto by an elastic joint comprising an elastic layer between two adhesive layers disposed between both faces of the lens and the clip.

2. In an eye glass, a lens having roughened cementing portions one on its anterior and one on its posterior face, and a clip straddling the edge of the lens at the roughened cementing portions and secured thereto by an elastic joint comprising adhesive layers applied to both faces of the lens and both leaves of the clip and intermediate elastic layers, one located on each side of the lens between the adhesive layers.

3. In an eye glass, a polygonal lens, a clip thereon having two side leaves adjoining the anterior and posterior faces of the lens, and a three sided edge portion adjoining three sides and two angles of the edge of the lens, and a flexible joint adhesively connecting the lens with the clip.

CHAS. M. SCHERER.